United States Patent
Sweetman et al.

(10) Patent No.: US 11,142,657 B2
(45) Date of Patent: Oct. 12, 2021

(54) PARTIALLY FLUORINATED ESTER COMPOUND ADDITIVES FOR ARCHITECTURAL COATINGS

(71) Applicant: THE CHEMOURS COMPANY FC, LLC, Wilmington, DE (US)

(72) Inventors: Karl Jeffery Sweetman, Wilmington, DE (US); Roman B. Larichev, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 188 days.

(21) Appl. No.: 16/080,909

(22) PCT Filed: Feb. 28, 2017

(86) PCT No.: PCT/US2017/019943
§ 371 (c)(1),
(2) Date: Aug. 29, 2018

(87) PCT Pub. No.: WO2017/151609
PCT Pub. Date: Sep. 8, 2017

(65) Prior Publication Data
US 2019/0106580 A1    Apr. 11, 2019

Related U.S. Application Data

(60) Provisional application No. 62/302,911, filed on Mar. 3, 2016.

(51) Int. Cl.
| | |
|---|---|
| *C09D 7/63* | (2018.01) |
| *C09D 133/16* | (2006.01) |
| *C09D 5/00* | (2006.01) |
| *C09D 7/61* | (2018.01) |
| *C09D 5/02* | (2006.01) |
| *C08K 5/10* | (2006.01) |
| *C08K 5/11* | (2006.01) |
| *C08K 5/103* | (2006.01) |

(52) U.S. Cl.
CPC ............. *C09D 7/63* (2018.01); *C09D 5/00* (2013.01); *C09D 5/024* (2013.01); *C09D 133/16* (2013.01); *C08K 5/10* (2013.01); *C08K 5/103* (2013.01); *C08K 5/11* (2013.01)

(58) Field of Classification Search
None
See application file for complete search history.

(56) References Cited

U.S. PATENT DOCUMENTS

| | | | |
|---|---|---|---|
| 2007/0066779 A1* | 3/2007 | Otaguro | C08F 20/22 526/242 |
| 2007/0212491 A1* | 9/2007 | Yen | C09D 167/06 427/331 |

FOREIGN PATENT DOCUMENTS

| | | |
|---|---|---|
| JP | S54-093197 | 7/1979 |
| JP | S58-10539 | 1/1983 |
| JP | H01-122027 | 5/1989 |
| JP | H02-28763 | 11/1990 |
| JP | 2000-506552 | 5/2000 |
| JP | 2000-515579 | 11/2000 |
| JP | 2013-533331 A | 8/2013 |
| JP | 2014-524990 A | 9/2014 |

OTHER PUBLICATIONS

International Search Report and Written Opinion issued in PCT/US2017/019943 dated May 17, 2017, 10 pages.
*Outlines of Paint Technology* (Halstead Press, New York, NY, Third edition, 1990).
C. R. Martens in "Emulsion and Water-Soluble Paints and Coatings" (Reinhold Publishing Corporation, New York, NY, 1965).
*Surface Coatings vol. I, Raw Materials and Their Usage* (Chapman and Hall, New York, NY, Second Edition, 1984).

\* cited by examiner

*Primary Examiner* — Ronak C Patel

(57) ABSTRACT

The present invention is a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

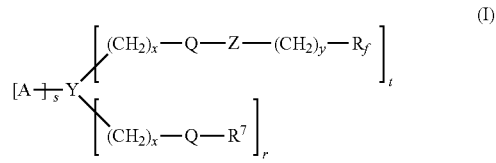

where A is —OH, a $C_1$-$C_{18}$ alkyl, —$CH_2COOH$, —$CH_2OH$, or $(CH_2CH_2O)_a(CH_2CH(CH_3)O)_bH$; a and b are 0 to 3; s is 0 to 2; Y is a linear or branched alkylene organic group having r+s+t substitutions; x is 0 or 1; Q is —C(O)O— or —OC(O)—; Z is —$(CH_2)_y$S— or —$(CH_2CH_2O)_m(CH_2CH(CH_3)O)_n$—; y is 2 to 6; m and n are 0 to 6; $R_f$ is a straight or branched perfluoroalkyl group of 2 to 20 carbon atoms; $R^7$ is a straight or branched $C_4$-$C_{30}$ alkyl; r is 1 to 4; and t is 1 to 5, such that r+s+t is 2 to 6.

10 Claims, No Drawings

PARTIALLY FLUORINATED ESTER COMPOUND ADDITIVES FOR ARCHITECTURAL COATINGS

This application represents a national filing under 35 U.S.C. 371 of International Application No. PCT/US2017/019943 filed Feb. 28, 2017, and claims priority of U.S. Provisional Application No. 62/302,911 filed Mar. 3, 2016.

FIELD OF THE INVENTION

This invention relates to a composition comprising a coating base and a fluorinated ester compound for use in architectural coating compositions such as water-based latex paints, to provide durable surface effects.

BACKGROUND OF THE INVENTION

The coating compositions of interest in the present invention include alkyd coating compositions, urethane coating compositions, water-dispersible coating compositions, and unsaturated polyester coating compositions, typically a paint, clear coating, or stain. All of the above-listed coating compositions after drying or curing often show low hexadecane contact angles, are readily wetted by oil, and are susceptible to soiling. The coating compositions are described in *Outlines of Paint Technology* (Halstead Press, New York, N.Y., Third edition, 1990) and *Surface Coatings Vol. I, Raw Materials and Their Usage* (Chapman and Hall, New York, N.Y., Second Edition, 1984).

Water-based latex coating bases, such as those employed as paint coatings, have a tendency to have low oil repellency and poor cleanability ratings. To impart better cleanability to interior and exterior paint surfaces, small molecule additives, including fluorosurfactants, have been used. However, the additives do not provide long-term performance and durability in exterior paint, which is subjected to more extreme environmental conditions. The additives can wash away from the coating surface within a few days.

BRIEF SUMMARY OF THE INVENTION

The present invention addresses the issues described above by introducing fluorinated ester compounds. The compounds are small enough to migrate to the coating surface while wet but stable enough to withstand being subjected to harsh elements. The ether and/or thioether groups of the present fluorinated ester compounds provide a hydrolytic stability that provides a performance benefit over the known fluorinated ester compounds. The compositions of the present invention provide performance as well as durability to the water-based latex coatings. They impart unexpectedly desirable surface effects such as: increased water and oil contact angles, enhanced dirt pickup resistance, and enhanced cleanability to the coating films.

The present invention relates to a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

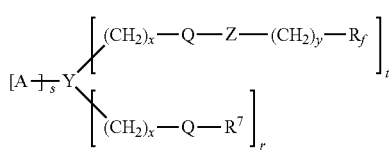

(I)

where A is independently —OH, a $C_1$-$C_{18}$ alkyl, —$CH_2COOH$, —$CH_2OH$, or $(CH_2CH_2O)_a(CH_2CH(CH_3)O)_bH$; a and b are independently 0 to 3, where a+b is 1 to 3; s is 0, 1, or 2; Y is a linear or branched alkylene organic group having r+s+t substitutions, optionally interrupted by ether oxygen —O— and optionally having one or more alkoxylate linking groups that bond with A, [$(CH_2)_x$-Q-Z—$(CH_2)_y$—$R_f$], or [$(CH_2)_x$-Q-$R^7$]; x is independently 0 or 1; Q is —C(O)O— or —OC(O)—; Z is —$(CH_2)_yS$— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms, optionally interrupted by one or more —$CH_2$—, —CFH—, ether oxygens —O—, or combinations thereof; $R^7$ is a straight or branched $C_4$-$C_{30}$ alkyl, optionally having 1 to 3 olefinic groups, and optionally interrupted by ether oxygens —O— or thioether sulfurs —S—; r is 1, 2, 3, or 4; and t is 1, 2, 3, 4, or 5, such that r+s+t is 2 to 6.

The present invention further comprises an article comprising a substrate and a dried coating thereon, where the dried coating results from drying a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

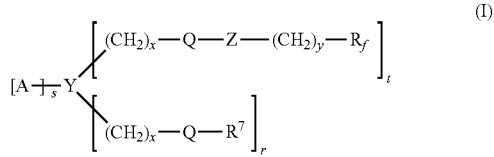

(I)

where A is independently —OH, a $C_1$-$C_{18}$ alkyl, —$CH_2COOH$, —$CH_2OH$, or $(CH_2CH_2O)_a(CH_2CH(CH_3)O)_bH$; a and b are independently 0 to 3, where a+b is 1 to 3; s is 0, 1, or 2; Y is a linear or branched alkylene organic group having r+s+t substitutions, optionally interrupted by ether oxygen —O— and optionally having one or more alkoxylate linking groups that bond with A, [$(CH_2)_x$-Q-Z—$(CH_2)_y$—$R_f$], or [$(CH_2)_x$-Q-$R^7$]; x is independently 0 or 1; Q is —C(O)O— or —OC(O)—; Z is —$(CH_2)_yS$— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms, optionally interrupted by one or more —$CH_2$—, —CFH—, ether oxygens —O—, or combinations thereof; $R^7$ is a straight or branched $C_4$-$C_{30}$ alkyl, optionally having 1 to 3 olefinic groups, and optionally interrupted by ether oxygens —O— or thioether sulfurs —S—; r is 1, 2, 3, or 4; and t is 1, 2, 3, 4, or 5, such that r+s+t is 2 to 6.

DETAILED DESCRIPTION OF THE INVENTION

Herein trademarks are shown in upper case.

The terms "(meth)acrylic" or "(meth)acrylate" indicate, respectively, methacrylic and/or acrylic, and methacrylate and/or acrylate; and the term (meth)acrylamide indicates methacrylamide and/or acrylamide.

By the term "alkyd coating" as used hereinafter is meant a conventional liquid coating based on alkyd resins, typically a paint, clear coating, or stain. The alkyd resins are complex branched and cross-linked polyesters containing unsaturated aliphatic acid residues.

By the term "urethane coating" as used hereinafter is meant a conventional liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. Urethane coatings are classified by ASTM D16 into five categories. Type I urethane coatings contain a minimum of 10% by weight of a pre-reacted autoxidizable binder, characterized by the absence of significant amounts of free isocyanate grous. These are also known as uralkyds, urethane-modified alkyds, oil-modified urethanes, urethane oils, or urethane alkyds. Type I urethane coatings are the largest volume category of polyurethane coatings and include paints, clear coatings, or stains. The cured coating for a Type I urethane coating is formed by air oxidation and polymerization of the unsaturated drying oil residue in the binder.

By the term "unsaturated polyester coating" as used hereinafter is meant a conventional liquid coating based on unsaturated polyester resins, dissolved in monomers and containing initiators and catalysts as needed, typically as a paint, clear coating, stain, or gel coat formulation.

By the term "water-dispersed coatings" as used herein is meant surface coatings intended for the decoration or protection of a substrate, comprising essentially an emulsion, latex, or suspension of a film-forming material dispersed in an aqueous phase, and optionally containing surfactants, protective colloids and thickeners, pigments and extender pigments, preservatives, fungicides, freeze-thaw stabilizers, antifoam agents, agents to control pH, coalescing aids, and other ingredients. Water-dispersed coatings are exemplified by, but not limited to, pigmented coatings such as latex paints, unpigmented coatings such as wood sealers, stains, and finishes, coatings for masonry and cement, and water-based asphalt emulsions. For latex paints the film forming material is a latex polymer of acrylate acrylic, styrene acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York, N.Y., 1965).

By the term "coating base" as used herein is meant a liquid formulation of a water-dispersed coating, an epoxy polymer coating, an alkyd coating, a Type I urethane coating, or an unsaturated polyester coating, which is later applied to a substrate for the purpose of creating a lasting film on said surface. The coating base includes those solvents, pigments, fillers, and functional additives found in a conventional liquid coating. For example, the coating base formulation may include a polymer resin and pigment dispersed in water, where the polymer resin is an acrylic polymer latex, vinyl-acrylic polymer, vinyl polymer, Type I urethane polymer, alkyd polymer, epoxy polymer, or unsaturated polyester polymer, or mixtures thereof.

By the structure $(CH_2CH_2O)_a(CH_2CH(CH_3)O)_bH$ or $—(CH_2CH_2O)_m(CH_2CH(CH_3)O)_n—$, it is intended that the ethylene oxide (EO) and propylene oxide (PPO) units may be present in any random or block order. For example, the unit order could be EO-EO-EO, EO-PPO, PPO-EO, PPO-EO-PPO, PPO-PPO-EO-EO, EO-EO-PPO, etc.

By the term "Y is a linear or branched alkylene organic group having t+s substitutions, optionally interrupted by ether oxygen —O— and optionally having one or more alkoxylate linking groups that bond with A, $[(CH_2)_x-Q-Z-(CH_2)_y—R_f]$, or $[(CH_2)_x-Q-R^7]$", it is meant that Y is either divalent (linear) or has a number of branches, where the number of branches is equal to t+s. Y is alkylene but may have an ether oxygen, such as those from dipentaerythritol or ditrimethylol propane, and/or Y may have one or more alkoxylate linking groups, such as from the reaction of a polyol with an alkoxylate. In one embodiment, the one or more alkoxylate linkages have 1, 2, or 3 alkoxylate repeat units. The number of alkoxylate substitutions and number of alkoxylate repeat units can be varied and may depend on the amount of alkoxylate used.

The present invention relates to a a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

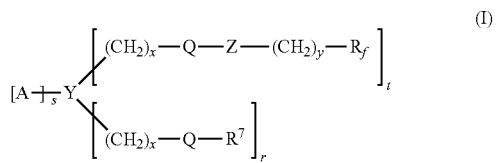

where A is independently —OH, a $C_1$-$C_{18}$ alkyl, —$CH_2COOH$, —$CH_2OH$, or $(CH_2CH_2O)_a(CH_2CH(CH_3)O)_bH$; a and b are independently 0 to 3, where a+b is 1 to 3; s is 0, 1, or 2; Y is a linear or branched alkylene organic group having r+s+t substitutions, optionally interrupted by ether oxygen —O— and optionally having one or more alkoxylate linking groups that bond with A, $[(CH_2)_x-Q-Z-(CH_2)_y—R_f]$, or $[(CH_2)_x-Q-R^7]$; x is independently 0 or 1; Q is —C(O)O— or —OC(O)—; Z is —$(CH_2)_y$S— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms, optionally interrupted by one or more —$CH_2$—, —CFH—, ether oxygens —O—, or combinations thereof; $R^7$ is a straight or branched $C_4$-$C_{30}$ alkyl, optionally having 1 to 3 olefinic groups, and optionally interrupted by ether oxygens —O— or thioether sulfurs —S—; r is 1, 2, 3, or 4; and t is 1, 2, 3, 4, or 5, such that r+s+t is 2 to 6. The fluorinated ester compounds contain at least one fluorine chain substitution t having a hydrolytically stable ether or thioether group, while also having at least one long-chain alkyl substitution. In one aspect, s is 0 or 1. In one aspect, s is 0 and the compound is a diester or branched multi-ester compound. In another aspect, r+t is greater than s. In another aspect, r+t is 3 to 6; and in another aspect, r+t is 3 or 4. In one aspect, t is greater than r.

As the number of fluorinated branches or alkyl groups increase and as the number of alkoxylate groups decrease, the compound becomes less soluble in water. In one embodiment, the fluorinated ester compound is water insoluble. In one aspect, the composition comprises a mixture of two or more different fluorinated ester compounds represented by Formula (I).

The alkyl group $R^7$ may contain ether oxygens —O— or thioether sulfur atoms —S—. The ether oxygens may be present as ethylene oxide or propylene oxide repeat units. The hydrophobicity increases with decreased numbers of ether oxygens. In one aspect, $R^7$ is a straight or branched $C_{10}$ to $C_{30}$ alkyl and contains no more than 3 ether oxygens —O— or thioether sulfur atoms —S—; in another aspect, $R^7$ is a straight or branched $C_8$ to $C_{30}$ alkyl and contains no more than 2 ether oxygens —O— or thioether sulfur atoms —S—; and in another aspect, $R^7$ is a straight or branched $C_6$ to $C_{30}$ alkyl and contains no more than 1 ether oxygens —O— or thioether sulfur atoms —S—. In one aspect, $R^7$ contains at least 4 uninterrupted carbons as an endgroup; in another aspect $R^7$ contains at least 6 uninterrupted carbons as an endgroup; and in a third aspect, $R^7$ contains at least 8 uninterrupted carbons as an endgroup.

The alkoxylate portions of the fluorinated ester compound, which can be present in Y, Z, or A, add flexibility and hydrophilicity to the compound. In one aspect, the number of alkoxylate units (a+b and/or m+n) is 1 to 5; in another aspect, the sum of a+b and/or m+n is 1 to 3; and in a third aspect, the sum of a+b and/or m+n is 1 to 2.

The fluorinated ester compounds can be made, for example, by the esterification of at least one carboxylic acid compound and at least one alcohol. In one embodiment, the fluorinated ester compounds are synthesized by the esterification of a polycarboxylic acid with a fluorinated alcohol and alkyl alcohol. In such a compound, Q is —C(O)O—. In one embodiment, A is only chosen as $CH_2COOH$ when Q is —C(O)O—. By the term polycarboxylic acid, it is meant that the compound has at least 2 carboxylic acid groups, such that the resulting fluorinated ester compound has a t of at least 2. Common carboxylic acids include, but are not limited to, citric acid, adipic acid, and mixtures thereof. Where citric acid is used, A is —OH; t is 3; and s is 1. Where adipic acid is used, s is 0 and t is 2.

Fluorinated alcohols include but are not limited to alkoxylated versions of $C_4F_9SO_2NH(CH_2)_3OH$, $C_6F_{13}SO_2NH(CH_2)_3OH$, $C_8F_{17}SO_2NH(CH_2)_3OH$, $C_4F_9SO_2NH(CH_2)_2OH$, $C_6F_{13}SO_2NH(CH_2)_2OH$, $C_8F_{17}SO_2NH(CH_2)_2OH$, $C_4F_9SO_2N(CH_3)(CH_2)_2OH$, $C_6F_{13}SO_2N(CH_3)(CH_2)_2OH$, $C_8F_{17}SO_2N(CH_3)(CH_2)_2OH$, $C_4F_9CH_2CF_2SO_2NH(CH_2)_3OH$, $C_3F_7OCF_2CF_2SO_2NH(CH_2)_3OH$, $C_4F_9CH_2CH_2CF_2CF_2SO_2NH(CH_2)_3OH$, $C_4F_9OCFHCH_2CH_2SO_2NH(CH_2)_3OH$, $C_4F_9SO_2CH_2CH_2NH(CH_2)_3OH$, $C_6F_{13}SO_2CH_2CH_2NH(CH_2)_3OH$, $C_8F_{17}SO_2CH_2CH_2NH(CH_2)_3OH$, $C_4F_9CH_2CH_2SO_2NHCH_2CH_2OH$, $C_6F_{13}CH_2CH_2SO_2NHCH_2CH_2OH$, $C_8F_{17}CH_2CH_2SO_2NHCH_2CH_2OH$, $C_4F_9CH_2CH_2SO_2N(CH_3)CH_2CH_2OH$, $C_6F_{13}CH_2CH_2SO_2N(CH_3)CH_2CH_2OH$, $C_8F_{17}CH_2CH_2SO_2N(CH_3)CH_2CH_2OH$, $C_4F_9(CH_2)_2OH$, $C_6F_{13}(CH_2)_2OH$, $C_8F_{17}(CH_2)_2OH$, $C_4F_9OH$, $C_6F_{13}OH$, $C_8F_{17}OH$, $C_4F_9CH_2CH_2CH_2OH$, $C_6F_{13}CH_2CH_2CH_2OH$, $C_4F_9CH_2OH$, $C_6F_{13}CH_2OH$, $C_4F_9CH_2CF_2CH_2CH_2OH$, $C_6F_{13}CH_2CF_2CH_2CH_2OH$, $C_4F_9CH_2CF_2CH_2CF_2CH_2CH_2OH$, $C_6F_{13}CH_2CF_2CH_2CF_2CH_2CH_2OH$, $C_3F_7OCF_2CF_2CH_2CH_2OH$, $C_2F_5OCF_2CF_2CH_2CH_2OH$, $CF_3OCF_2CF_2CH_2CH_2OH$, $C_3F_7(OCF_2CF_2)_2CH_2CH_2OH$, $C_2F_5(OCF_2CF_2)_2CH_2CH_2OH$, $CF_3(OCF_2CF_2)_2CH_2CH_2OH$, $C_3F_7OCHFCF_2OCH_2CH_2OH$, $C_2F_5OCHFCF_2OCH_2CH_2OH$, $CF_3OCHFCF_2OCH_2CH_2OH$, $C_3F_7OCHFCF_2OCH_2CH_2CH_2OH$, $C_2F_5OCHFCF_2OCH_2CH_2CH_2OH$, $CF_3OCHFCF_2OCH_2CH_2CH_2OH$, $C_4F_9CH_2CH_2SCH_2CH_2OH$, $C_6F_{13}CH_2CH_2SCH_2CH_2OH$, $C_4F_9SCH_2CH_2OH$, $C_6F_{13}SCH_2CH_2OH$, $C_4F_9CH_2CH_2CF_2CF_2CH_2CH_2OH$, $C_3F_7OCF(CF_3)C(O)NHCH_2CH_2OH$, $C_3F_7OCF(CF_3)C(O)N(CH_3)CH_2CH_2OH$, $C_4F_9NHC(O)NHCH_2CH_2OH$, $C_6F_{13}NHC(O)NHCH_2CH_2OH$, $HCF_2(CF_2)_4CH_2OH$, $HCF_2(CF_2)_6CH_2OH$, $HCF_2(CF_2)_8CH_2OH$, and similar variations thereof. Mixtures of fluorinated alcohols or alkoxylated fluorinated alcohols may also be used. Such alkoxylated fluorinated alcohols can be made by reacting, for example, ethylene oxide or propylene oxide with the alcohols listed above using conventional reaction methods. In one embodiment, $R_f$ is a straight or branched perfluoroalkyl group of 4 to 12 carbon atoms, optionally interrupted by one or more —CH2-, —CFH—, ether oxygens —O—, or combinations thereof; in another embodiment, $R_f$ is a straight or branched perfluoroalkyl group of 4 to 6 carbon atoms, optionally interrupted by one or more —CH2-, —CFH—, ether oxygens —O—, or combinations thereof. Alkyl alcohols include straight or branched simple alkanols, or include ethers and thioethers of such. The alkyl alcohols may have 1 to 3 olefinic groups, such as in oleic alcohol.

Another method for forming the fluorinated ester compounds comprises reacting at least a polyol with at least one fluorinated carboxylic acid and at least one alkyl carboxylic acid. In such a compound, Q is —OC(O)—. By the term polyol, it is meant that the compound has at least 2 hydroxyl groups, such that the resulting fluorinated ester compound has a t of at least 2. In one embodiment, A is chosen as —$CH_2OH$ only when Q is —OC(O)—. Common polyols include, but are not limited to, pentaerythritol, dipentaerythritol, alkoxylated pentaerythritol, alkoxylated dipentaerythritol, trimethylolpropane, ditrimethylolpropane, alkoxyalted trimethylolpropane, alkoxylated ditrimethylolpropane, trimethylolethane, ditrimethylolethane, alkoxylated trimethylolethane, alkoxylated ditrimethylolethane, glycerol, alkoxylated glycerol, and mixtures thereof. Alkoxylated polyols can be made by reacting, for example, ethylene oxide or propylene oxide with polyols using conventional reaction methods.

Examples of fluorinated carboxylic acids include, but are not limited to, thioether compounds, such as those made by reacting a fluorinated iodide with thiopropionic acid. Examples of fluorinated iodides include but are not limited to $C_4F_9SO_2NH(CH_2)_3I$, $C_6F_{13}SO_2NH(CH_2)_3I$, $C_8F_{17}SO_2NH(CH_2)_3I$, $C_4F_9SO_2NH(CH_2)_2I$, $C_6F_{13}SO_2NH(CH_2)_2I$, $C_8F_{17}SO_2NH(CH_2)_2I$, $C_4F_9SO_2N(CH_3)(CH_2)_2I$, $C_6F_{13}SO_2N(CH_3)(CH_2)_2I$, $C_8F_{17}SO_2N(CH_3)(CH_2)_2I$, $C_4F_9CH_2CF_2SO_2NH(CH_2)_3I$, $C_3F_7OCF_2CF_2SO_2NH(CH_2)_3I$, $C_4F_9CH_2CH_2CF_2CF_2SO_2NH(CH_2)_3I$, $C_4F_9OCFHCH_2CH_2SO_2NH(CH_2)_3I$, $C_4F_9SO_2CH_2CH_2NH(CH_2)_3I$, $C_6F_{13}SO_2CH_2CH_2NH(CH_2)_3I$, $C_8F_{17}SO_2CH_2CH_2NH(CH_2)_3I$, $C_4F_9CH_2CH_2SO_2NHCH_2CH_2I$, $C_6F_{13}CH_2CH_2SO_2NHCH_2CH_2I$, $C_8F_{17}CH_2CH_2SO_2NHCH_2CH_2I$, $C_4F_9CH_2CH_2SO_2N(CH_3)CH_2CH_2I$, $C_6F_{13}CH_2CH_2SO_2N(CH_3)CH_2CH_2I$, $C_8F_{17}CH_2CH_2SO_2N(CH_3)CH_2CH_2I$, $C_4F_9(CH_2)_2OH$, $C_6F_{13}(CH_2)_2I$, $C_8F_{17}(CH_2)_2I$, $C_4F_9I$, $C_6F_{13}I$, $CF_{17}I$, $C_4F_9CH_2CH_2CH_2I$, $C_6F_{13}CH_2CH_2CH_2I$, $C_4F_9CH_2I$, $C_6F_{13}CH_2I$, $C_4F_9CH_2CF_2CH_2CH_2I$, $C_6F_{13}CH_2CF_2CH_2CH_2I$, $C_4F_9CH_2CF_2CH_2CF_2CH_2CH_2I$, $C_6F_{13}CH_2CF_2CH_2CF_2CH_2CH_2I$, $C_3F_7OCF_2CF_2CH_2CH_2I$, $C_2F_5OCF_2CF_2CH_2CH_2I$, $CF_3OCF_2CF_2CH_2I$, $C_3F_7(OCF_2CF_2)_2CH_2CH_2I$, $C_2F_5(OCF_2CF_2)_2CH_2CH_2I$, $CF_3(OCF_2CF_2)_2CH_2CH_2I$, $C_3F_7OCHFCF_2OCH_2CH_2I$, $C_2F_5OCHFCF_2OCH_2CH_2I$, $CF_3OCHFCF_2OCH_2CH_2I$, $C_3F_7OCHFCF_2OCH_2CH_2CH_2I$, $C_2F_5OCHFCF_2OCH_2CH_2CH_2I$, $CF_3OCHFCF_2OCH_2CH_2I$, $C_4F_9CH_2CH_2SCH_2CH_2I$, $C_6F_{13}CH_2CH_2SCH_2CH_2I$, $C_4F_9SCH_2CH_2I$, $C_6F_{13}SCH_2CH_2I$, $C_4F_9CH_2CH_2CF_2CF_2CH_2CH_2I$, $C_3F_7OCF(CF_3)C(O)NHCH_2CH_2I$, $C_3F_7OCF(CF_3)C(O)N(CH_3)CH_2CH_2I$, $C_4F_9NHC(O)NHCH_2CH_2I$, $C_6F_{13}NHC(O)NHCH_2CH_2I$, $HCF_2(CF_2)_4CH_2I$, $HCF_2(CF_2)_6CH_2I$, $HCF_2(CF_2)_8CH_2I$, and similar variations thereof. Alkyl carboxylic acids include straight or branched simple carboxylic acids, or include ethers and thioethers of such. The alkyl alcohols may have 1 to 3 olefinic groups, such as in oleic acid. Common fatty acids may be used.

In one embodiment, Y is a $C_2$ to $C_{10}$ linear alkylene or a structure of Formulas (II), (III), or (IV):

$$\underset{R^3 \quad R^4}{\overset{R^1 \quad R^2,}{\diagdown C \diagup}} \quad (II)$$

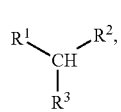

(III)

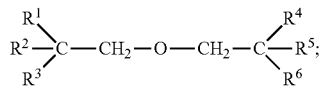

(IV)

where $R^1$, $R^2$, $R^3$, $R^4$, $R^5$, and $R^6$ are independently —$CH_2$—$(CH_2CH_2O)_a(CH_2CH(CH_3)O)_b$—, a direct bond to A, or a direct bond to $[(CH_2)_x$-Q-Z—$(CH_2)_y$—$R_f]$; wherein a and b are defined as above. Where Y is a structure of Formula (II), the compound may be derived from pentaerythritol, alkoxylated pentaerythritol, trimethylolpropane, alkoxylated trimethylolpropane, trimethylolethane, alkoxylated trimethylolethane, or citric acid. In one embodiment, at least one of $R^1$, $R^2$, $R^3$, $R^4$ in Formula (II) is —$CH_2$—$(CH_2CH_2O)_a(CH_2CH(CH_3)O)_b$—; in another embodiment, at least two of $R^1$, $R^2$, $R^3$, $R^4$ in Formula (II) are —$CH_2$—$(CH_2CH_2O)_a(CH_2CH(CH_3)O)_b$—; and in a third embodiment, at least three of $R^1$, $R^2$, $R^3$, $R^4$ in Formula (II) are —$CH_2$—$(CH_2CH_2O)_a(CH_2CH(CH_3)O)_b$—.

Where Y is a structure of Formula (III), the compound may be derived from glycerol or alkoxylated glycerol. In one embodiment, at least one of $R^1$, $R^2$, $R^3$, $R^4$ in Formula (III) is —$CH_2$—$(CH_2CH_2O)_a(CH_2CH(CH_3)O)_b$— and in another embodiment, at least two of $R^1$, $R^2$, $R^3$, $R^4$ in Formula (III) are —$CH_2$—$(CH_2CH_2O)_a(CH_2CH(CH_3)O)_b$—.

Where Y is a structure of Formula (IV), the compound may be derived from dipentaerythritol, alkoxylated dipentaerythritol, ditrimethylolpropane, alkoxylated ditrimethylolpropane, ditrimethylolethane, or alkoxylated ditrimethylolethane. In one embodiment, at least one of $R^1$, $R^2$, $R^3$, $R^4$, $R^5$, and $R^6$ in Formula (IV) is —$CH_2$—$(CH_2CH_2O)_a(CH_2CH(CH_3)O)_b$—; in another embodiment, at least two of $R^1$, $R^2$, $R^3$, $R^4$, $R^5$, and $R^6$ in Formula (IV) are —$CH_2$—$(CH_2CH_2O)_a(CH_2CH(CH_3)O)_b$—; and in a third embodiment, at least three of $R^1$, $R^2$, $R^3$, $R^4$, $R^5$, and $R^6$ in Formula (IV) are —$CH_2$—$(CH_2CH_2O)_a(CH_2CH(CH_3)O)_b$—.

In one aspect, one A is —OH or a $C_1$ to $C_{18}$ alkyl group. In one aspect, s is 1 and A is —OH or a $C_1$ to $C_{18}$ alkyl group. In one aspect, the alkyl group of A is chosen from $C_1$ to $C_8$; and in another aspect, the alkyl group is chosen from $C_1$ to $C_4$. In one embodiment, the carboxylic acid groups of the polycarboxylic acid or the primary hydroxyl groups of the polyol are fully reacted with the fluorinated or alkyl alcohol, or with the fluorinated or alkyl acid. Depending on the synthetic and isolation methods used, a mixture of inventive compounds may be formed during reaction. The inventive compounds may be isolated or may be used in combination with synthetic byproducts. Reaction conditions such as temperature, time, and stoichiometry, for example, may be altered to increase the conversion of the carboxylic acid groups of the polycarboxylic acid or of the primary hydroxyl groups of the polyol to ester groups. The conversion rate may be monitored and tailored, for example, by NMR. This would result in a higher percentage of the inventive compounds present.

The fluorinated ester compounds are useful as coatings additives, wherein the fluorinated ester compound can be added to a coating base, which is applied to a substrate. The fluorinated ester compound may be added directly, or may be added in the form of an aqueous dispersion, aqueous emulsion, or in organic solvent solution. In one aspect, the composition comprising a coating base in an amount of about 95 to 99.98% and the fluorinated ester compound in an amount of about 0.02 to 5% by weight, based on the total weight of the coating base and fluorinated ester compound, which equals 100%.

As noted above, the coating base is a liquid formulation of a water-dispersed coating, an epoxy polymer coating, an alkyd coating, a Type 1 urethane coating, or an unsaturated polyester coating, which is later applied to a substrate for the purpose of creating a lasting film on said surface. In one embodiment, the coating base is a water-dispersed coating in the form of an aqueous acrylic latex paint. The coating base includes those solvents, pigments, fillers, and functional additives found in a conventional liquid coating. Typically, the coating base may include a resin compound from 10 to 60% by weight, from 0.1 to 80% by weight of functional additives including pigments, fillers, and other additives, and the balance of the coating base composition is water or solvent. For an architectural coating, the resin compound is in an amount of about 30 to 60% by weight, functional additives including pigments, extenders, fillers, and other additives are in an amount of 0.1 to 60% by weight, with the balance being water or solvent.

The coating compositions may also include a pigment. Such a pigment may be part of the coating base formulation, or may be added subsequently. Any pigment can be used with the present invention. The term "pigment" as used herein means opacifying and non-opacifying ingredients which are particulate and substantially non-volatile in use. Pigment as used herein includes ingredients labeled as pigments, but also ingredients typically labeled in the coating trade as inerts, extenders, fillers, and similar substances.

Representative pigments that can be used with the present invention include, but are not limited to, rutile and anatase $TiO_2$, clays such as kaolin clay, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, MONASTAL Blue G (C.I. Pigment Blue 15), molybdate Orange (C.I. Pigment Red 104), Toluidine Red YW (C.I. Pigment 3)-process aggregated crystals, Phthalo Blue (C.I. Pigment Blue 15)-cellulose acetate dispersion, Toluidine Red (C.I. Pigment Red 3), Watchung Red BW (C.I. Pigment Red 48), Toluidine Yellow GW (C.I. Pigment Yellow 1), MONASTRAL Blue BW (C.I. Pigment Blue 15), MONASTRAL Green BW (C.I. Pigment Green 7), Pigment Scarlet (C.I. Pigment Red 60), Auric Brown (C.I. Pigment Brown 6), MONASTRAL Green G (C.I. Pigment Green 7), MONASTRAL Maroon B, MONASTRAL Orange, and Phthalo Green GW 951.

Titanium dioxide ($TiO_2$) is the preferred pigment to use with the present invention. Titanium dioxide pigment, useful in the present invention, can be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

The fluorinated ester compound is effectively introduced to the coating base by thoroughly contacting, e.g., by mixing the complex compound composition with the coating base. The contacting of complex compound and coating base can be performed, for example and conveniently, at ambient temperature. More elaborate contacting or mixing methods can be employed such as using a mechanical shaker or providing heat. Such methods are generally not necessary and generally do not substantially improve the final coating composition.

The complex compound of the invention is generally added at about 0.02 weight % to about 5 weight % on a dry weight basis of the polymer compound to the weight of the wet paint. In one embodiment, from about 0.02 weight % to about 0.5 weight % is used, and in a third embodiment, from about 0.05 weight % to about 0.25 weight % of the complex compound is added to the paint.

The present invention further comprises an article comprising a substrate and a dried coating thereon, where the dried coating results from drying a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

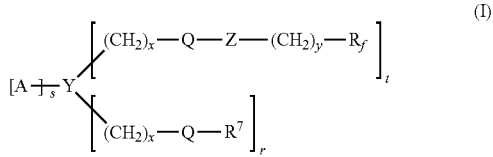

where A is independently —OH, a $C_1$-$C_{18}$ alkyl, —$CH_2COOH$, —$CH_2OH$, or $(CH_2CH_2O)_a(CH_2CH(CH_3)O)_bH$; a and b are independently 0 to 3, where a+b is 1 to 3; s is 0, 1, or 2; Y is a linear or branched alkylene organic group having r+s+t substitutions, optionally interrupted by ether oxygen —O— and optionally having one or more alkoxylate linking groups that bond with A, $[(CH_2)_x$-Q-Z—$(CH_2)_y$—$R_f]$, or $[(CH_2)_x$-Q-$R^7]$; x is independently 0 or 1; Q is —C(O)O— or —OC(O)—; Z is —$(CH_2)_s$S— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms, optionally interrupted by one or more —$CH_2$—, —CFH—, ether oxygens —O—, or combinations thereof; $R^7$ is a straight or branched $C_4$-$C_{30}$ alkyl, optionally having 1 to 3 olefinic groups, and optionally interrupted by ether oxygens —O— or thioether sulfurs —S—; r is 1, 2, 3, or 4; and t is 1, 2, 3, 4, or 5, such that r+s+t is 2 to 6

The coating compositions of the present invention are useful for providing a protective and/or decorative coating to a wide variety of substrates. Such substrates include primarily construction materials and hard surfaces. The substrate is preferably selected from the group consisting of wood, metal, wallboard, masonry, concrete, fiberboard, and paper. Other materials may also be used as the substrate. Any method of contacting a coating composition with a substrate can be used. Such methods are well known to a person skilled in the art, such as by brush, spray, roller, doctor blade, wipe, dip, foam, liquid injection, immersion or casting.

The compositions of the present invention provide performance as well as durability to coatings. They impart unexpectedly desirable surface effects such as: increased water and oil contact angles, enhanced dirt pickup resistance, and enhanced cleanability to the coating films. For these reasons, the compositions of the present invention are particularly useful in exterior coatings and paints.

Materials and Test Methods

All solvents and reagents, unless otherwise indicated, were purchased from Sigma-Aldrich, St. Louis, Mo., and used directly as supplied. WAQE is sodium lauryl sulfate, a surfactant that is available from Sigma-Aldrich. 2-perfluorohexylethanol and perfluorohexyl iodide were obtained from The Chemours Company, Wilmington Del.

$C_6F_{13}CH_2CH_2(OCH_2CH_2)_2OH$ was synthesized by ethoxylating 2-perfluorohexylethanol using conventional methods.

Test Methods

Dosing of Polymer Additives in Paint and Test Panel Application

Aqueous dispersions of fluoroacrylic copolymers of the present invention were added at 350 ppm fluorine levels to selected commercially available interior and exterior latex paints that were, prior to dosing, free of fluoroadditives. The sample was mixed using an overhead Cowles Blade stirrer at 600 rpm for 10 minutes. The mixture was then transferred to a glass bottle, sealed and placed on a roll mill overnight to allow uniform mixing of the fluoropolymer. The samples were then drawn down uniformly on a black Leneta Mylar® card (5.5"×10") or Aluminium Q-panel (4"×12") via a BYK-Gardner drawdown apparatus using 5 mL bird-applicator. The paint films were then allowed to dry at room temperature for 7 days.

Test Method 1. Evaluation of Oil and Water Repellency Via Contact Angle Measurement Oil and water contact angle measurements were used to test for the migration of fluoroadditive to the surface of the paint film. Oil and water contact angle testing was performed by goniometer on 1 inch strips of Leneta panel coated with dried paint film. A Ramé-Hart Standard Automated Goniometer Model 200 employing DROPimage standard software and equipped with an automated dispensing system, 250 μl syringe, and illuminated specimen stage assembly was used. The goniometer camera was connected through an interface to a computer, allowing the droplet to be visualized on a computer screen. The horizontal axis line and the cross line could both be independently adjusted on the computer screen using the software.

Prior to contact angle measurement, the sample was placed on the sample stage and the vertical vernier was adjusted to align the horizontal line (axis) of the eye piece coincident to the horizontal plane of the sample. The horizontal position of the stage relative to the eye piece was positioned so as to view one side of the test fluid droplet interface region at the sample interface.

To determine the contact angle of the test fluid on the sample, approximately one drop of test fluid was dispensed onto the sample using a 30 μL pipette tip and an automated dispensing system to displace a calibrated amount of the test fluid. For oil contact angle measurements, hexadecane was suitably employed. Horizontal and cross lines were adjusted via the software in case of the Model 200 after leveling the sample via stage adjustment, and the computer calculated the contact angle based upon modeling the drop appearance. The initial contact angle is the angle determined immediately after dispensing the test fluid to the sample surface. Initial contact angles above 30 degrees are indicators of effective oil repellency.

Test Method 2. Dirt Pick-Up Resistance (DPR) Test for Exterior Paints

DPR testing was used to evaluate the ability of the painted panels to prevent dirt accumulation. An artificial dry dirt comprised of silica gel (38.7%), aluminum oxide powder (38.7%), black iron oxide powder (19.35%) and lamp black powder (3.22%) was used for this test. The dust components were mixed and placed on a roller for 48 h for thorough mixing and stored in a decicator.

Exterior paint samples were drawn down to Aluminium Q-panels cut to a size of 1.5"×2", and four replicates of these samples were taped onto a 4"×6" metal panel. The initial whiteness ($L^*_{initial}$) of each Q-panel was measured using a Hunter Lab colorimeter. The 4"×6" metal panel was then inserted into a 45 degree angle slot cut in a wooden block. The dust applicator containing metal mesh dispensed the dust on the panels until the panels were completely covered with dust. The excess dust was then removed by lightly tapping the mounted panels 5 times on the wooden block inside the shallow tray. The 4"×6" panel which held the dusted panels was then clamped onto a Vortex-Genie 2 for 60 seconds to remove any remaining dust. The panel was then removed and tapped 10 times to dislodge any remaining dust. The whiteness ($L^*_{dusted}$) of each 1.5"×2" sample was re-measured using the same colorimeter, and the difference in whiteness before and after dusting was recorded. The values were averaged. DPR is expressed in terms of $\Delta L^*$, where $\Delta L^* = (L^*_{initial} - L^*_{dusted})$. A lower $\Delta L^*$ value indicates better dirt pick-up resistance.

Test Method 3. Weathering (WOM) for DPR and Oil Contact Angle Durability

Accelerated weathering of coated Q-panels was performed in an ATLAS Ci5000 Xenon Lamp Weather-o-Meter. The Xenon lamp was equipped with Type S Boro Inner and Outer Filters. Weathering cycles were performed according to D6695, cycle 2. During the weathering period, the panels were subjected to repeated 2-hour programs, which included 18 minutes of light and water spray followed by 102 minutes of light only. During the entire program, panels were held at 63° C. and during the UV only segment relative humidity was held at 50%.

For a 24-hour WOM program, freshly coated aluminum Q-panels were allowed to air dry for 7-days. The initial whiteness ($L^*_{initial}$) of each Q-panel was measured using a Hunter Lab colorimeter. One set of panels was subjected to DPR testing (as per Test Method 2) as well as oil and water contact angle testing (as per Test Method 1). A duplicate set of panels was placed in the weather-o-meter and allowed to proceed through 12 continuous 2-hour cycles according to the description above. After completion of the weathering cycles, the panels were dried, evaluated according to Test Methods 1 and 2, and re-subjected to DPR.

EXAMPLES

Preparation of $C_6F_{13}CH_2CH_2SCH_2CH_2COOH$

A 1 liter flask was equipped with a thermocouple, mechanical stirring, reflux condenser, nitrogen inlet, and addition funnel. The reactor flask was charged with perfluorohexyl iodide (173 g), isopropanol (158 g), and thiopropionic acid (42.7 g), and the mixture was heated to reflux at 80° C. An aqueous $K_2CO_3$ solution (57 g in 83.5 g water) was added dropwise while maintaining a temperature of 80° C. The mixture was held at reflux for an additional 5.5 hrs until none of the starting iodide could be detected. The mixture was cooled to below 40° C. and gradually neutralized with an aqueous solution of HCl (41 g in 220 g of water). The mixture was stirred for an additional 15 minutes at 50° C. The organic material was extracted and solvent was removed by distillation.

Example 1

A 200-mL 2-neck flask was equipped with a thermocouple, magnetic stir bar, and a short path distillation head with a vacuum take off adaptor. The reactor was charged with $C_6F_{13}CH_2CH_2SCH_2CH_2COOH$ (18.05 g), 1,1,1-trimethylol propane (3.11 g), oleic acid (5.64 g), and toluene sulfonic acid (0.35 g). The flask was heated to 150° C. for 1 hour and then the pressure was gradually reduced to 10-20 mmHg. The reaction was held for an additional 2-3 hours at 150° C. and cooled to yield 25.1 g. The reaction product (10.4 g) was dissolved in MIBK (10.4 g), and was then charged with water (10.4 g) and WAQE surfactant (0.3 g). This mixture was warmed briefly to 50° C., sonicated, diluted further with water (5-10 mL), and distilled to yield 32 g.

Example 2

To a 50 mL flask equipped with a short condenser were added $C_6F_{13}CH_2CH_2(OCH_2CH_2)_2OH$ (10 g, 22 mmol), 1-dodecanol (4.1 g, 22 mmol), and citric acid (2.82 g, 14.7 mmol). The resultant mixture was heated for 3 hours at 135° C. To a 250-mL flask was added the partially fluorinated ester reaction product (10 g) and a solution of WAQE surfactant (1.2 g) in water (38.8 g). The resultant solution was stirred and heated to 65° C. for 10 minutes. Then the mixture was transferred to 100-mL plastic cup and then sonicated to give a stable dispersion in water.

Example 3

The present synthesis was run under conditions to maximize the conversion of acid groups to ester groups, forming a higher percentage of the inventive compound in the final composition. To a 50 mL flask equipped with a short condenser were added $C_6F_{13}CH_2CH_2(OCH_2CH_2)_2OH$ (6.9 g, 15.3 mmol), 1-dodecanol (2.9 g, 15.6 mmol), and citric acid (2.00 g, 10.4 mmol). The resultant mixture was heated for 6 days at 140° C. The resultant citrate ester (5.4 g) was added to a solution of WAQE surfactant (0.9 g) in water (29.1 g) and the mixture was sonicated to give a stable dispersion in water.

Example 4

To a 50 mL flask equipped with a short condenser were added $C_6F_{13}CH_2CH_2(OCH_2CH_2)_2OH$ (8.0 g, 17.7 mmol), oleyl alcohol (2.4 g, 8.9 mmol), and citric acid (1.75 g, 9.4 mmol). The resultant mixture was heated for 5 days at 140° C. The resultant citrate ester (7.5 g) was added to a solution of WAQE surfactant (0.9 g) in water (29.1 g) and the mixture was sonicated to give a stable dispersion in water.

Comparative Example A

Exterior paint with no additive was tested according to the test methods described.

TABLE 1

Performance of Examples 1 and 2 in Exterior Paint

| | | Example | | | | |
|---|---|---|---|---|---|---|
| | | 1 | 2 | 3 | 4 | A |
| DPR (ΔL)* | Initial | 2.9 | 2.4 | 5.6 | 4.1 | 9.8 |
| | 1 day WOM | 2.6 | 4.6 | 4.6 | 2.7 | 7.5 |
| | 3 day WOM | 5.6 | 5.5 | 3.5 | 3.8 | 7.5 |
| Water Contact Angle** | Initial | | 111 | 85 | 86 | 78 |
| | 1 day WOM | | 94 | 92 | 99 | 95 |
| | 3 day WOM | | 93 | 98 | 101 | 95 |
| Oil Contact Angle** | Initial | | 71 | 61 | 67 | 8 |
| | 1 day WOM | | 17 | 40 | 58 | 0 |
| | 3 day WOM | | 0 | 32 | 51 | 0 |

*A lower number indicates better performance.
**A higher number indicates better performance.

What is claimed is:

1. A composition comprising (a) a coating base selected from a water-dispersed coating, an epoxy polymer coating, an alkyd coating, a Type I urethane coating, or an unsaturated polyester coating; and (b) a fluorinated ester compound represented by formula (I):

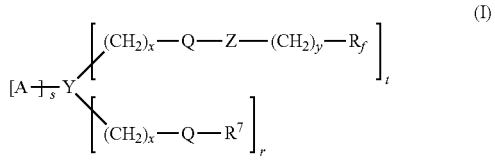

where
A is independently —OH, a $C_1$-$C_{18}$ alkyl, —$CH_2COOH$, —$CH_2OH$, or $(CH_2CH_2O)_a(CH_2CH(CH_3)O)_bH$;
a and b are independently 0 to 3, where a+b is 1 to 3;
s is 0, 1, or 2;
Y is a linear or branched alkylene organic group having r+s+t substitutions, optionally interrupted by ether oxygen —O— and optionally having one or more alkoxylate linking groups that bond with A, [$(CH_2)_x$-Q-Z—$(CH_2)_y$—$R_f$], or [$(CH_2)_x$-Q-$R^7$];
x is independently 0 or 1;
Q is —C(O)O— or —OC(O)—;
Z is —$(CH_2)_y$S— or —$(CH_2CH_2O)_m(CH_2CH(CH_3)O)_n$—;
y is 2 to 6;
m and n are independently 0 to 6, where m+n is 1 to 6;
$R_f$ is a straight or branched perfluoroalkyl group of 2 to 20 carbon atoms, optionally interrupted by one or more —$CH_2$—, —CFH—, ether oxygens —O—, or combinations thereof;
$R^7$ is a straight or branched $C_4$-$C_{30}$ alkyl, optionally having 1 to 3 olefinic groups, and optionally interrupted by ether oxygens —O— or thioether sulfurs —S—;
r is 1, 2, 3, or 4; and
t is 1, 2, 3, 4, or 5, such that r+s+t is 2 to 6.

2. The composition of claim 1, wherein the composition comprises (a) the coating base in an amount of from about 95 to 99.98% and (b) the fluorinated ester compound in an amount of from about 0.02 to 5% by weight, based on the total weight of (a) and (b).

3. The composition of claim 1, where A is OH or $C_1$ to $C_4$ alkyl.

4. The composition of claim 1, where s is 0 or 1.

5. The composition of claim 1, where r+t is 3 or 4.

6. The composition of claim 1, where t is greater than r.

7. The composition of claim 1, where Y is a $C_2$ to $C_{10}$ linear alkylene or a structure of formulas (II), (III), or (IV):

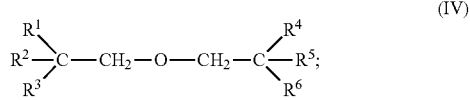

where $R^1$, $R^2$, $R^3$, $R^4$, $R^5$, and $R^6$ are independently —$CH_2$—$(CH_2CH_2O)_a(CH_2CH(CH_3)O)_b$—, a direct bond to A, a direct bond to [$(CH_2)_x$-Q-Z—$(CH_2)_y$—$R_f$], or a direct bond to [$(CH_2)_x$-Q-$R^7$]; wherein a and b are defined as above.

8. The composition of claim 1, where the fluorinated ester compound (b) is water insoluble.

9. The composition of claim 1, where the coating base is a water-dispersed coating in the form of an aqueous acrylic latex paint.

10. The composition of claim 1, where the coating base comprises an additive selected from $TiO_2$, clays, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, blue pigments, red pigments, yellow pigments, orange pigments, process aggregated crystals, brown pigments, or green pigments.

* * * * *